United States Patent
Fukuda et al.

(10) Patent No.: US 10,282,707 B2
(45) Date of Patent: May 7, 2019

(54) SCHEDULING BUSINESS PROCESS

(71) Applicant: INTERNATIONAL BUSINESS MACHINES CORPORATION, Armonk, NY (US)

(72) Inventors: Mari A. Fukuda, Tokyo (JP); Ai Yoshino, Tokyo (JP); Takuya Nakaike, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 14/790,664

(22) Filed: Jul. 2, 2015

(65) Prior Publication Data
US 2017/0004460 A1  Jan. 5, 2017

(51) Int. Cl.
*G06Q 10/06* (2012.01)
*G06Q 10/10* (2012.01)

(52) U.S. Cl.
CPC . *G06Q 10/1097* (2013.01); *G06Q 10/063114* (2013.01); *Y04S 10/54* (2013.01)

(58) Field of Classification Search
CPC ..................................................... G06Q 10/10
See application file for complete search history.

(56) References Cited

U.S. PATENT DOCUMENTS 5,901,308 A * 5/1999 Cohn ....................... G06F 8/445
  712/216
6,243,788 B1 * 6/2001 Franke .................. G06F 9/5033
  711/3

2011/0154002 A1 * 6/2011 Liu ....................... G06F 8/4442
  712/234

(Continued)

FOREIGN PATENT DOCUMENTS

JP   H11353378 A   12/1999
JP   200022480 A   8/2000

(Continued)

OTHER PUBLICATIONS

Ahukanna, D., et al., IBM Business Process Manager Version 8.0 Production Topologies, ibm.com/redbooks, Jul. 2013. (pp. 1-474).

(Continued)

*Primary Examiner* — Kurtis Gills
(74) *Attorney, Agent, or Firm* — Tutunjian & Bitetto, P.C.; Vazken Alexanian (57) ABSTRACT

A system and method for scheduling a business process including tasks, comprises a calculation unit, a determination unit, and a decision unit. The calculation unit is configured to calculate an estimated processing time required to execute the tasks. The determination unit is configured to calculate an estimated end time of a route including the tasks on the basis of the estimated processing time and schedule of a user to execute the tasks, and determine whether to apply speculative execution to the business process on the basis of the estimated end time. The decision unit is configured to decide to speculatively execute a task out of the tasks in the business process. The decision is made with reference to a remaining period for executing the task. The remaining period is calculated on the basis of a predicted execution timing of each task and a deadline of the business process.

9 Claims, 5 Drawing Sheets

(56) References Cited

U.S. PATENT DOCUMENTS

| | | | | |
|---|---|---|---|---|
| 2013/0132962 A1* | 5/2013 | De Smet | ............... | G06F 9/4881 |
| | | | | 718/102 |
| 2013/0231978 A1* | 9/2013 | Curbera | ........... | G06Q 10/06393 |
| | | | | 705/7.36 |
| 2014/0007044 A1* | 1/2014 | Aliseychik | ................ | G06F 8/30 |
| | | | | 717/106 |

FOREIGN PATENT DOCUMENTS

| | | | |
|---|---|---|---|
| JP | 2003036343 A | 2/2003 |
| JP | 2004288175 A | 10/2004 |
| JP | 2005149522 A | 6/2005 |
| JP | 2006341537 A | 12/2006 |
| JP | 2007156678 A | 6/2007 |
| JP | 200753111 A | 11/2007 |
| JP | 2013200753 A | 10/2013 |

OTHER PUBLICATIONS

Singhoff, F., "Real time scheduling theory and its use with Ada," ACM SIGAda'07 tutorial, Dec. 2007. (pp. 1-79).

* cited by examiner

| Pn | | T0 | T1 | T2 | T3 | T4 |
|---|---|---|---|---|---|---|
| P0 | ○—○—○ | ✓ | ✓ | ✓ | | |
| P1 | ○—○—○<br>   ○—○ | ✓ | ✓ | ✓ | ✓ | ✓ |
| P2 | ○—○ | ✓ | ✓ | | | |
| P3 | ○ | ✓ | | | | |
| ⋮ | | | | | | |
| PN-1 | | | | | | |
| mj | | 4 | 3 | 2 | 1 | 1 |

SCHEDULING BUSINESS PROCESS

BACKGROUND

Technical Field

The present invention relates to a system for controlling a business process, and more specifically, to a system for scheduling a business process including tasks.

Description of the Related Art

Delay of business process execution negatively impacts business of companies, business units, and other organizations that operate the business process. In many cases, a business process consists of multiple tasks with assigned users who have their own schedule. In that nature, it is difficult to prevent delay of the business process only with the decision of individual users who are assigned for each task. Non-patent Literature 1, entitled "IBM Business Process Manager Version 8.0.1, Production Topologies", implements scheduling of a task by an algorithm, such as round robin. However, it cannot predict delay of the business process and, therefore, cannot prevent delay of the business process. In non-Patent Literature 2, entitled "Real-time scheduling theory and its use with Ada", the deadline is considered in a scheduling algorithm. However, it assumes that performance of each processor that executes the tasks is fixed and constant.

SUMMARY

According to an embodiment of the present principles, a system for scheduling a business process including tasks is provided. The system includes a calculation unit, a determination unit, and a decision unit. The calculation unit is configured to calculate, for each one of the tasks, an estimated processing time required to execute the one of the tasks. The determination unit is configured to calculate an estimated end time of a route including at least one of the tasks on the basis of the estimated processing time of the at least one of the tasks and a schedule of each one of users to execute the at least one of the tasks. The route runs from an execution context to an end of the business process. The determination unit is configured to determine whether to apply speculative execution to the business process on the basis of the estimated end time of the route. The decision unit is configured to make a decision to speculatively execute a task out of the tasks included in the business process in response to the determination of the determination unit to apply the speculative execution. The decision is made with reference to, as one condition, a remaining period for executing the task. The remaining period is calculated on the basis of a predicted execution timing of the task and a deadline of the business process.

According to another embodiment of the present principles, a method for scheduling a business process including tasks is provided. The method includes estimating a user's processing time for each one of the tasks. The user's processing time indicates a time required for each one of users to execute the one of the tasks. The method also includes calculating an estimated processing time required to execute the one of the tasks on the basis of the estimated user's processing time. The method further includes calculating processing accuracy for each one of the tasks. The processing accuracy indicates whether the business process including the one of the tasks executed by one of the users is completed normally. The method further includes calculating an estimated end time of a route including at least one of the tasks. The route runs from an execution context to an end of the business process. The estimated end time is calculated on the basis of the estimated processing time of the at least one of the tasks and a schedule of each one of the users. The method further includes determining whether to apply speculative execution to the business process on the basis of the estimated end time of the route. The method includes calculating, for each one of the tasks, an estimated execution probability of executing the one of the tasks. The method also includes calculating a remaining period for executing each task that is speculatively executable, out of the tasks included in the business process. The remaining period is calculated on the basis of a predicted execution timing of each task and a deadline of the business process. The system calculates a standard cost required to execute each task that is speculatively executable. The system decides to speculatively execute a task out of the tasks included in the business process in a case where a value exceeds a threshold value. The value is obtained by adding weighted values of the estimated execution probability, the remaining period and the standard cost. The method further includes identifying a user to execute the task to be speculatively executed, on the basis of the processing accuracy and the user's processing time.

According to still another embodiment of the present principles, a computer program product for scheduling a business process including tasks is provided. The computer program product comprises a computer readable storage medium having program instructions embodied with the computer readable storage medium. The program instructions are executable by a computer to cause the computer to estimate a user's processing time for each one of the tasks. The user's processing time indicates a time required for each one of users to execute the one of the tasks. The program instructions are executable by the computer to cause the computer to calculate an estimated processing time required to execute the one of the tasks on the basis of the estimated user's processing time. The program instructions are executable by the computer to cause the computer to calculate an estimated end time of a route, including at least one of the tasks. The route runs from an execution context to an end of the business process. The estimated end time is calculated on the basis of the estimated processing time of the at least one of the tasks and a schedule of the users. The program instructions are executable by the computer to cause the computer to determine whether to apply speculative execution to the business process on the basis of the estimated end time of the route. The program instructions are executable by the computer to cause the computer to make a decision to speculatively execute a task out of the tasks included in the business process upon the determination to apply the speculative execution. The decision is made on the basis of at least one of an estimated execution probability of executing the task, a remaining period for executing the task, and a standard cost required to execute the task. The remaining period is calculated on the basis of a predicted execution timing of the task and a deadline of the business process. The standard cost is calculated on the basis of a unit cost of each one of the users and a time required for each one of the users to execute each task.

DETAILED DESCRIPTION OF THE EMBODIMENTS

Hereinafter, exemplary embodiments of the present invention will be described in detail with reference to the attached drawings. It should be understood that the present invention is not limited to the exemplary embodiments given below and may be implemented with various modifications within the scope of the present invention. In addition, the drawings used herein are for purposes of illustration.

One exemplary embodiment provides a system configured to control a business process. The business process is a series of logically related tasks executed to produce a defined set of results. This task in the business process may be executed by a business processor user. The business process user is a user who is responsible for the task. In other words, the business process user is a user who is competent to be assigned the task. The business process user is hereinafter simply referred to as a "user".

According to an embodiment, the system is configured to control the business process by estimating the processing time and accuracy of the user in executing the task, and calculating a cost of the task, a ratio (probability) of executing the task, and a deadline of the task. In particular, the system is configured to control each task and perform speculative execution, if required. Such system may efficiently control the schedule of each task to prevent a delay in the business process. Speculative execution is defined as executing a task in the business process that is independent of other task(s) in the business process.

Figure 1:
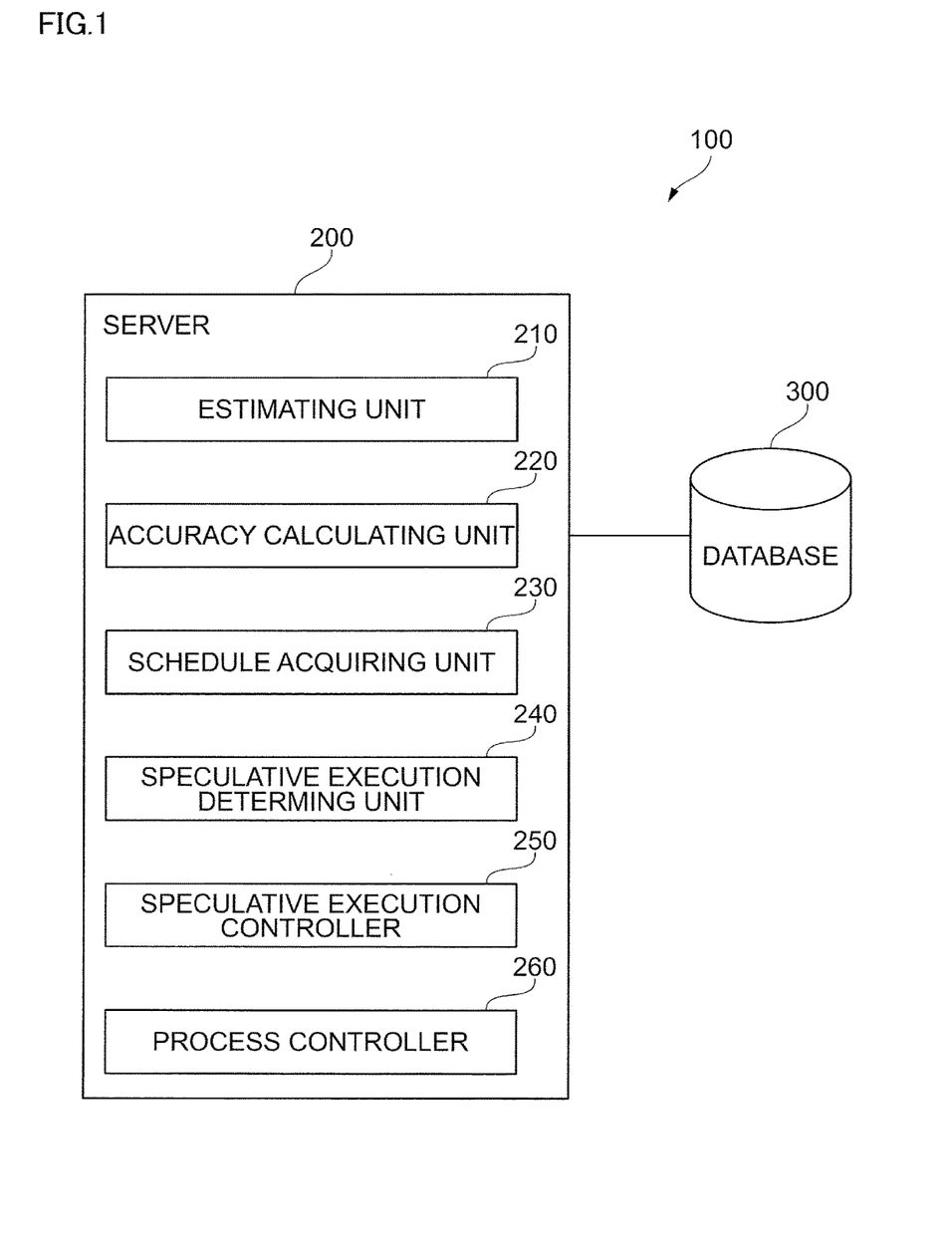
FIG. 1 is a block diagram of a business process control system according to an embodiment.

FIG. 1 is a block diagram of a business process control system 100 according to an embodiment. The business process control system 100 may include a server 200 and a database 300.

The server 200 may include an estimating unit 210, an accuracy calculating unit 220, a schedule acquiring unit 230, a determining unit 240, a speculative execution controller 250, and a process controller 260. These control blocks are performed by a central processing unit ("CPU").

The estimating unit 210, as an example of the calculation unit, is configured to calculate an estimated processing time for each task in the business process. The estimated processing time is an estimated time required to execute the task. For example, the estimated processing time is calculated based on a user's processing time, which is an average time for the user to execute the task. The user's processing time is estimated based on a process execution history, which will be described later.

The accuracy calculating unit 220, as an example of the processing accuracy calculation unit, is configured to calculate a processing accuracy for each task in the business process. The processing accuracy is accuracy of the user in executing the task. In other words, the processing accuracy indicates a likelihood that the business process will be completed normally. More specifically, the processing accuracy is defined as whether a business process involving a specific task executed by a specific user is completed normally. The processing accuracy is calculated based on the process execution history.

The schedule acquiring unit 230 is configured to acquire schedule information of the user from the database 300 for each task in the business process. If the schedule information is managed by software on an external server, such as groupware, the schedule acquiring unit 230 is further configured to access the external server via a network to acquire the schedule information.

The determining unit 240, as an example of the determination unit, is configured to determine whether to start speculative execution of each task in the business process, based on the progress of the business process, information on each task, and the schedule information of the user. In particular, the determining unit 240 is configured to identify a route from the task in an execution context to the end of the business process, and calculate an estimated end date (e.g., estimated end time). The task in the execution context refers to a task that is in progress at a specific time. The estimated end date is a date when the business process is estimated to be completed. Such estimated end date is calculated by adding required times for each task on the routes identified by the determining unit 240. The determining unit 240 is configured to determine whether the estimated end date, which is latest on the timeline, in other words, which is the last, is over the deadline of the business process.

The speculative execution controller 250, as an example of the decision unit, is configured to decide to perform speculative execution by using an objective function. The speculative execution controller 250 is further configured to calculate variables indicating an estimated execution ratio, a remaining period, and an average cost. In other words, the speculative execution controller 250 is configured to perform three calculating functions: a calculating function of the estimated execution ratio, a calculating function of the remaining period, and a calculating function of the average cost.

The estimated execution ratio is an estimated execution probability of executing each task included in the business process. The remaining period is the time left to complete the task. The remaining period is calculated based on an estimated time to execute the task, which is an example of the predicted execution timing, and on the deadline of the business process, for each task that is speculatively executable. The average cost, which is an example of the standard cost, is a required cost to execute each task in the business process.

As a simple example, the objective function f(Tj) is provided below:

$$f(Tj)=s \cdot S(\alpha(Tj))+t \cdot S(1-P(Tj))+u \cdot S(\text{cost}(Tj))$$

In the above formula, $\alpha(Tj)$ is the remaining period, $P(Tj)$ is the estimated execution ratio, and $\text{cost}(Tj)$ is the average cost. The function S is the deviation-deriving function. The variables s, t, and u are weight coefficients. The relationship of the variables s, t, and u, as an example of the weighted values, is defined by a formula $s+t+u=1$. In other words, the objective function f(Tj) is based on at least one of the remaining period, the estimated execution ratio, and the average cost. The variable s may be set to more than zero (e.g., s>0) to derive the objective function f(Tj) in terms of the remaining period. Details of the operations according to the above calculating functions will be described later.

The process controller 260 is configured to control the business process based on the execution result of each task in the business process. Such execution result may include the result of speculatively executed tasks under the control of the speculative execution controller 250. The process controller 260 is further configured to work as a process run-time.

The database 300 is configured to store at least three kinds of information: a business process definition ("BPD"), a process execution history, and a user schedule.

The BPD is a definition to be used in executing the task. For example, the BPD includes data of "user", "cost", and "variable". The "user" is the user as defined in this embodiment, i.e., the business process user. The "cost" is a cost per unit time of the user. The "variable" may be a variable value of an input or an output of the task. Such variable value may vary depending on the task. The database 300 is configured to store the BPD, in which the data of "variable" and "cost" is linked to individual tasks.

The process execution history is actual history data of the executed business process and the executed tasks in the business process. For example, the process execution history may include "task instance id", "task name", "user", "start time", "end time", and "status". The "task instance id" is a code of a task instance. The task instance is the history of the executed task. The "task name" is a name, i.e., a type of the executed task. The "user" is the user as defined in this embodiment. The "start time" is the time when the task starts. The "end time" is the time when the task finishes. The "status" is whether the task is completed, i.e., normally ended. The database 300 is configured to store the process execution history, in which these data are linked to "task instance id". The database 300 is configured to store different data for the same task executed in different business process instances.

The process execution history may also include "process instance id", "start time" and "end time". The "process instance id" is a code of a process instance. The process instance is the history of the executed business process. The "start time" is the time when the process starts. The "end time" is the time when the process finishes. The data of the "start time" and the "end time" are linked to the "process instance id" in the process execution history.

The user schedule is the schedule of the user, such as an operation schedule and a vacation schedule. For example, the user schedule may be obtained from data managed by software on the external server, such as groupware.

The operation of the above mentioned business process control system 100 may be roughly described as acquiring information of the user, acquiring information of the speculative execution, and performing the speculative execution. Acquiring information of the user may involve calculating the processing accuracy and an average processing time. Acquiring information of the speculative execution may involve determining a necessity of the speculative execution and calculating the estimated execution ratio, the remaining period, and the average cost. Performing the speculative execution may involve assigning the user and controlling the speculative execution. The operation of the business process control system 100 will now be described in detail.

Figure 2:
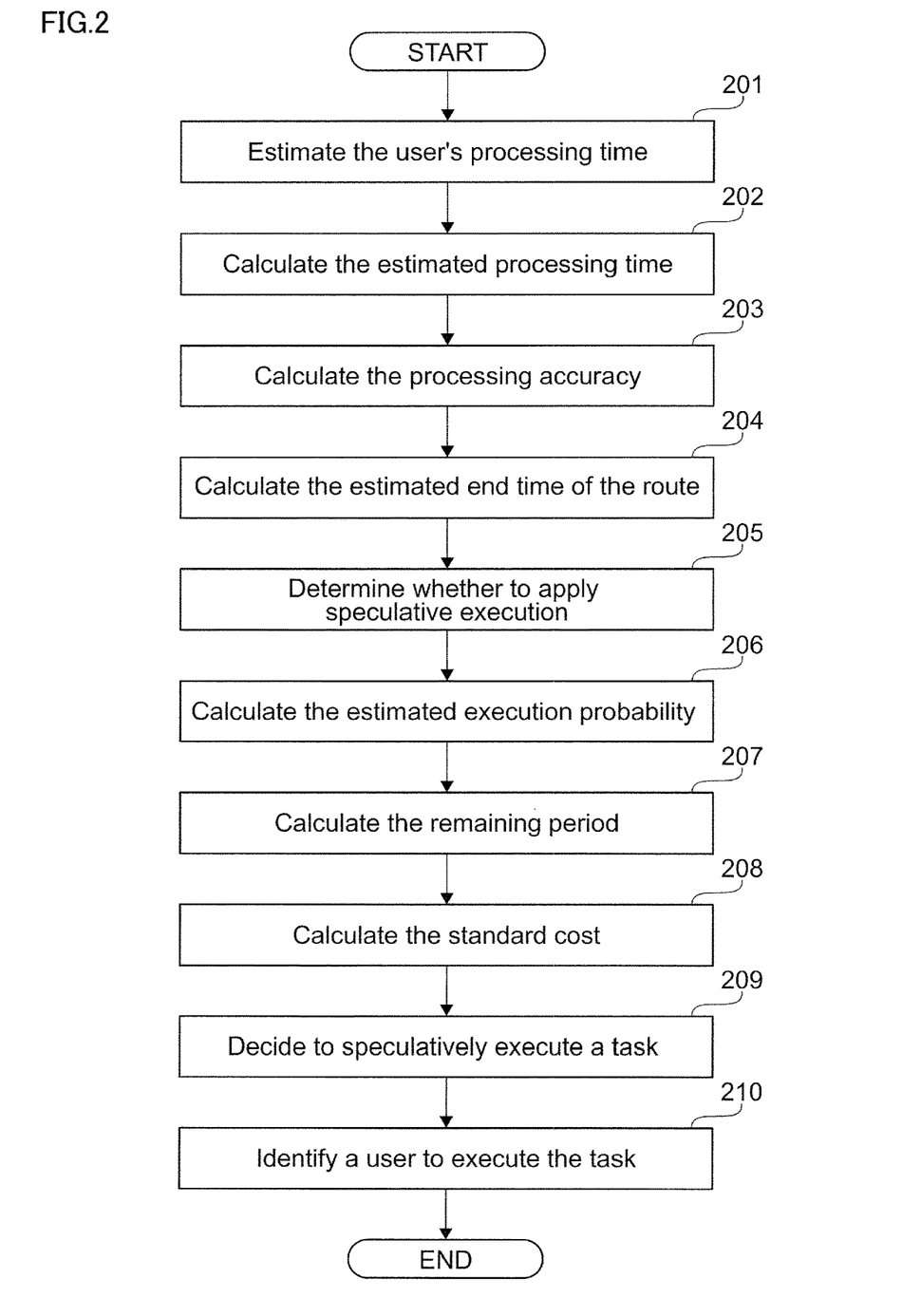
FIG. 2 is a flowchart of the method of the business process control system according to an embodiment.

FIG. 2 is a flowchart of the operation of the business process control system 100 according to an embodiment.

In the operation of the business process control system 100, the estimating unit 210 estimates the user's processing time (step 201) and calculates the estimated processing time (step 202). The accuracy calculating unit 220 then calculates the processing accuracy (step 203). The determining unit 240 calculates the estimated end time of the route (step 204), and determines whether to apply speculative execution to the business process (step 205).

The speculative execution controller 250 then calculates the estimated execution probability (step 206). The speculative execution controller 250 calculates the remaining period (a) (step 207), and calculates the standard cost (step 208). The speculative execution controller 250 decides to speculatively execute a task out of the tasks included in the business process (step 209). The process controller 260 then identifies a user to execute the task (step 210). Hereinafter, the operation of each step in the flowchart in FIG. 2 will be described in detail.

At steps 201 and 202 in FIG. 2, the estimating unit 210 calculates the estimated processing time and calculates the estimated processing time. In this embodiment, the standard processing time is the average processing time. To calculate the estimated processing time, the BPD is stored in the database 300 in advance. The BPD may include a list of the user(s) for the task(s) Tj.

In calculating the average processing time, the estimating unit 210 first acquires the list of task(s) Tj ($0 \leq j < J$). The variable j is set to zero, i.e., the task T0 is selected as the processing target. The variable k is then set to zero, i.e., the user U0 is selected among the user(s) Uk ($0 \leq k < K$) for the task Tj. The estimating unit 210 then calculates averageElaspedTime(Uk, Tj) based on the prosecution history. The averageElaspedTime(Uk, Tj) is an average of the processing time for one user Uk to execute the task Tj.

The variable k is set to k+1, i.e., the variable k of the user Uk is incremented by one. The estimating unit 210 then determines whether the variable k is equal to K (k==K?). If the variable k is not equal to K, the estimating unit 210 returns to the above process of calculating the averageElaspedTime(Uk, Tj), and repeats the above calculation until the variable k reaches K, i.e., until finishing the calculation for all users Uk. If the variable k is equal to K, the estimating unit 210 calculates averageElaspedTime(Tj). The averageElaspedTime(Tj) is an average of the processing time for all users Uk to execute the task Tj. The averageElaspedTime(Tj) is obtained by dividing a total of the averageElaspedTime(Uk, Tj) of all users U0 to UK−1 by K.

The variable j is then set to j+1, i.e., the variable j of task Tj is incremented by one. The estimating unit 210 determines whether the variable j is equal to J (j==J?). If the variable j is not equal to J, the estimating unit 210 returns to the above process of setting the variable k to zero, and repeats the above calculation until the variable j reaches J, i.e., until finishing the calculation for all tasks Tj in the business process. If the variable j is equal to J, the operation for calculating the average processing time finishes.

In this embodiment, the estimated processing time is set to the average of the processing time. However, the estimated processing time may be set by different calculation methods. For example, the estimated processing time may be the maximum time in the process execution history.

At step 203 in FIG. 2, the accuracy calculating unit 220 calculates the processing accuracy. In the embodiment, the BPD is stored in the database 300 in advance. The BPD may include a list of the user(s) to be assigned the task(s) Tj. For example, such list may include information of the user's skills or user's aptitude, or performance of the user in the previous business processes.

In calculating the processing accuracy, the accuracy calculating unit 220 first acquires the list of task(s) Tj ($0 \leq j < J$). The variable j is set to zero, i.e., the task T0 is selected as a processing target. The variable k is then set to zero, i.e., the user U0 is selected among the user(s) Uk ($0 \leq k < K$) for the task Tj. The variable K of the user Uk may vary depending on the selected task Tj.

The accuracy calculating unit 220 then acquires the process instance(s) from the database 300 to set a variable M. In other words, the accuracy calculating unit 220 acquires the execution path(s) involving the task Tj, which has been executed by the user Uk. The accuracy calculating unit 220 then counts the number of the process instances that have been completed normally, among the acquired process instances, to set a variable N.

The accuracy calculating unit 220 then calculates the accuracy(Uk, Tj) by dividing the variable N by the variable M (accuracy(Uk, Tj)=N/M). Such accuracy(Uk, Tj) is the ratio of the normally completed process instances (N) to the process instances (M) involving the task Tj executed by the user Uk.

The variable k is set to k+1, i.e., the variable k of the user Uk is incremented by one. The accuracy calculating unit 220 then determines whether the variable k is equal to K (k==K?).

If the variable k is not equal to K, the accuracy calculating unit 220 returns to the above process of acquiring the process instance(s), and repeats the above calculation until the variable k reaches K, i.e., until finishing the calculation for all users Uk. If the variable k is equal to K, the variable j is set to j+1, i.e., the variable j of the task Tj is incremented by one.

The accuracy calculating unit 220 then determines whether the variable j is equal to J (j==J?). If the variable j is not equal to J, the accuracy calculating unit 220 returns to the above process of setting the variable k to zero, and repeats the above calculation until the variable j reaches J, i.e., until finishing the calculation for all tasks Tj in the business process. If the variable k is equal to K, the operation for calculating the processing accuracy finishes.

At steps 204 and 205 in FIG. 2, the determining unit 240 calculates the estimated end time of the route, and determines whether to apply speculative execution to the business process, i.e., to start the speculative execution. The determining unit 240 identifies a route(s) Ri (0<i<I) from the task in the execution context to the end of the business process. If the business process has a branch, multiple routes Ri may be identified. If an identified route leads to an infinite loop, the determining unit 240 ignores such a route.

The variable i is then set to zero, i.e., the route RO is selected as a processing target. The determining unit 240 then acquires information on the task(s) Td (0≤d<D) on the route Ri. In particular, the determining unit 240 counts a number of the task(s) Td. The variable D of the task Td may vary depending on the selected route Ri. The task T0 is the task in the execution context. The determining unit 240 then calculates an estimated end time of the task Td to set it to an estimated end time Ed. The estimated end time E0 represents a current date and time.

The variable d is then set to zero, i.e., the task T0 is selected as a processing target. The variable d is set to d+1, i.e., the variable d of the task Td is incremented by one. The determining unit 240 then acquires a list of the user(s) assigned the task Td.

The determining unit 240 then defines an unavailable period Xd of the user(s) Uk (0≤k<K) as Φ. The unavailable period Xd is a period in which all users Uk are inactive and unavailable. The Φ is an initial value of the unavailable period Xd. In particular, the determining unit 240 defines the unavailable period Xd of the user Uk (0≤k<K) as null. The variable k is then set to zero, i.e., the user U0 is selected among all users U0 to UK−1 for the task Tj.

The determining unit 240 acquires an unavailable period notAvailable(Uk) by referring to the schedule information on each user Uk. The determining unit 240 defines the unavailable period Xd as the unavailable period Xd AND notAvailable(Uk). More specifically, "AND" is a logical product, and the determining unit 240 defines an overlapping period of the previous unavailable period Xd and notAvailable(Uk) as an updated unavailable period Xd.

The determining unit 240 then determines whether the variable k is equal to K−1 (k==K−1?). If the variable k is not equal to K−1, the variable k is set to k+1, i.e., the variable k of the user Uk is incremented by one. The determining unit 240 then returns to the above process of acquiring the unavailable period notAvailable(Uk), and repeats the above calculation until the variable k reaches K−1, i.e., until finishing the calculation for all users Uk.

If the variable k is equal to K−1, the determining unit 240 calculates the estimated end time Ed of the task Td by adding the estimated end time Ed−1 of a predecessor task Td−1, averageElapsedTime(Td) for the task Td, and the unavailable period Xd. Also, expectedExecutionDatetime (Td) of the task Td is set to the estimated end time Ed of the task Td. The determining unit 240 then determines whether the variable d is equal to D (d==D?). If the variable d is not equal to D, the determining unit 240 returns to the above process of setting the variable d to d+1, and repeats the above calculation until the variable d reaches D, i.e., until finishing the calculation for all tasks Td.

If the variable d is equal to D, the determining unit 240 sets the estimated end date Di of the route Ri to the estimated end time Ed. The estimated end time Ed at this point is the result of adding all averageElapsedTime(Td) for all tasks Td on the route Ri.

The determining unit 240 then determines whether the variable i is equal to I−1 (i==I−1?). If the variable i is not equal to I−1, the variable i is set to i+1, i.e., the variable i of the route Ri is incremented by one. The determining unit 240 then returns to the above process of acquiring information, and repeats the above calculation until the variable i reaches I−1, i.e., until finishing the calculation for all routes Ri.

If the variable i is equal to I−1, the determining unit 240 sets the latest estimated end date Di on the timeline to the variable Di_max. Such latest estimated end date Di is the last date (time) in the estimated end dates Di.

The determining unit 240 then judges whether the estimated date Di_Max is over the deadline of the business process. If the estimated date Di_Max is over the deadline of the business process, the determining unit 240 determines to perform the speculative execution to complete the business process before the deadline. If the estimated date Di_Max is not over the deadline of the business process, the determining unit 240 determines not to perform the speculative execution, because the business process may be completed before the deadline without the speculative execution.

At step 206 in FIG. 2, the speculative execution controller 250 calculates the estimated execution probability. In this embodiment, the estimated execution probability is defined as the execution ratio. To calculate the estimated execution probability, the BPD is stored in the database 300 in advance. The BPD may include a list of the user(s) for the task Tj.

In calculating the estimated execution ratio, the speculative execution controller 250 first acquires the list of task(s) Tj (0≤j<J). The variable n is set to zero, i.e., the process instance P0 is selected as a processing target among all process instances Pn (0≤n<N−1). The speculative execution controller 250 stores all tasks Tj in the selected process instance Pn.

The variable n is set to n+1, i.e., the variable n of process instance Pn is incremented by one. The speculative execution controller 250 then determines whether the variable n is equal to N (n==N?). If the variable n is not equal to N, the speculative execution controller 250 returns to the above process of storing all tasks Tj, and repeats the above calculation until the variable n reaches N, i.e., until finishing the calculation for all process instances Pn.

If the variable n is equal to N, the variable j is set to zero, i.e., the task T0 is selected as the processing target. The speculative execution controller 250 counts the number of the selected task(s) Tj in all process instances P0 to PN-1, and sets the counted number of the task(s) Tj to a variable mj. The speculative execution controller 250 then calculates the estimated execution ratio P(Tj) by dividing the variable mj by the variable N (execution ratio P(Tj)=mj/N). The estimated execution ratio P(Tj) is the ratio of the target task Tj to the number of all process instances.

The variable j is set to j+1, i.e., the variable j of the task Tj is incremented by one. The speculative execution controller 250 then determines whether the variable j is equal to J (j==J?). If the variable j is not equal to J, the speculative execution controller 250 returns to the above process of counting the number of the selected task(s) Tj, and repeats the above calculation until the variable j reaches J, i.e., until finishing the calculation for all tasks Tj. If the variable j is equal to J, the operation for calculating the estimated execution ratio finishes.

In this embodiment, the estimated execution ratio is defined as a ratio of the target task Tj to the number of all process instances Pn. However, the estimated execution ratio may be obtained by different calculation methods. Alternatively, any estimated execution ratio may be given as a default value.

Figure 3:
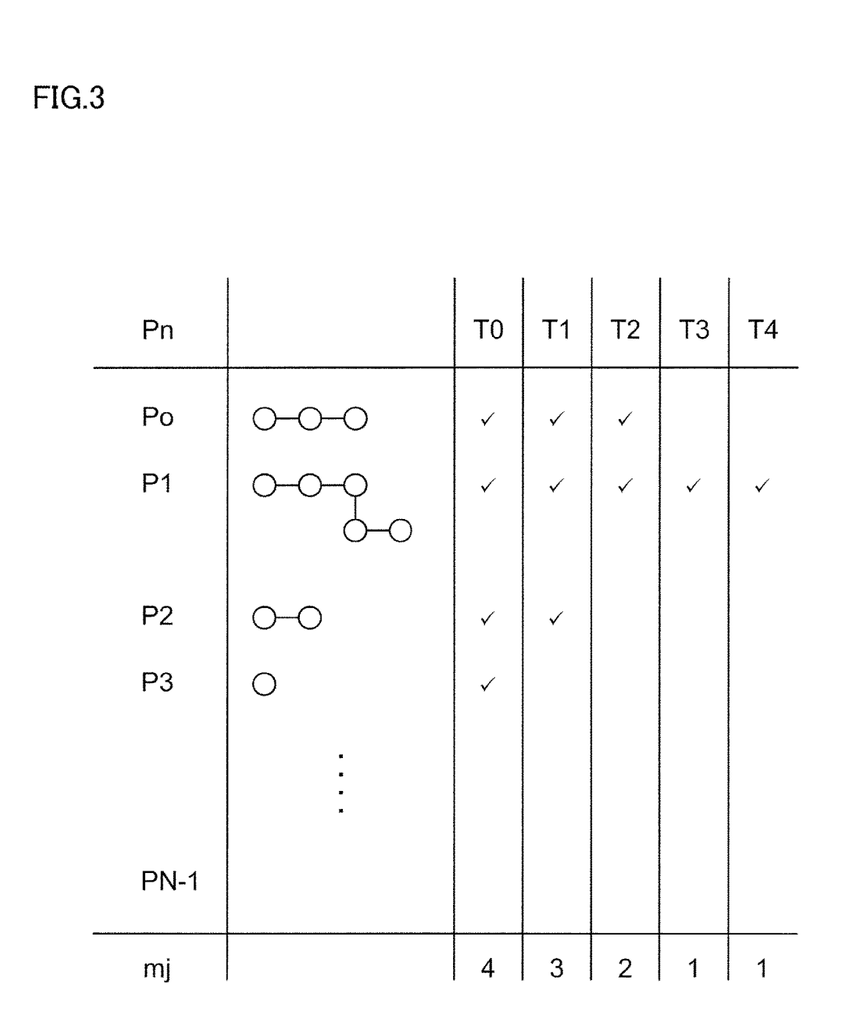
FIG. 3 is a table for calculating the estimated execution ratio.

FIG. 3 is a table for calculating the estimated execution ratio. The table represents an example of information generated during the calculation of the estimated execution ratio. The table shows a relationship between the process instance(s) Pn ($0 \leq n < N-1$) and the task(s) Tj ($0 \leq j < J$). More specifically, the task Tj that is included in each process instance Pn is ticked in the table. For example, the process instance P0 involves three tasks T0 to T2, and thus the tasks T0 to T2 are ticked in the table. The process instance P1 involves five tasks T0 to T4, and thus the tasks T0 to T4 are ticked in the table. Likewise, the process instance P2 involves two tasks T0 and T1, and the process instance P3 involves a single task, i.e., the task T0, and these tasks are ticked (e.g., checked off) in the table.

The table also shows a number of the counted task(s) Tj as the variable mj. For example, the task T0 is included in the process instances P0 to P3, the variable mj(j=0) is thus set to "4". The estimated execution ratio P(T0) of the task T0 is calculated by dividing the variable mj by the variable N. The estimated execution ratio P(T0) of the task T0 is 4/N in this example.

At step 207 in FIG. 2, the speculative execution controller 250 calculates the remaining period. The speculative execution controller 250 identifies a route(s) Qr($0 \leq r < R$) from the end of the business process to the task Tj in the execution context. The direction of the route Qr runs from the end of the business process to the current position in the execution context. In other words, the direction of the route Qr is opposite to the direction of the route Ri ($0 \leq i < I$).

The speculative execution controller 250 then identifies a speculatively executable task on the route Qr, and adds the task to a list p_task. A speculatively executable task is a task that is independent of the other tasks on the route Qr. A task can be said to be independent of the other tasks if, for example, the execution of the task is not influenced by the result of the other tasks, i.e., the task does not use the result of the other tasks. Another example of the independent task is that the task can be run without waiting for the completion of the other tasks, i.e., the order of execution of the task in the business process is flexible. The speculatively executable task is, in particular, identified based on a variable value of the task on the route Qr.

The speculative execution controller 250 calculates a process deadline P_d by adding the start time of the business process and a limited time period for the business process. The process deadline P_d is a deadline to complete the business process. The limited time period for the business process is the maximum required time to complete the business process.

The variable r is then set to zero, i.e., the route Q0 is selected among all routes Q0 to QR-1. The speculative execution controller 250 acquires information on each task Ti($0 \leq i < I$) on the route Qr. The task T0 is the final node and the task TI-1 is the next task in the execution context. In particular, the speculative execution controller 250 counts a number of the tasks from the final node to the execution context.

The variable i is set to zero. In other words, the task T0 is selected among the tasks T0 to TI-1. The variable i of the task Ti is then incremented by one. The estimated end date Ei is set to the process deadline P_d of the route Ri.

Deadline(Ti) is set to the estimated end date Ei, and the estimated end date Ei+1 is set to the estimated end date Ei minus aveET(Ti). The deadline(Ti) is the final deadline to initiate the task Ti. Since the variable i=0+1 by default, the deadline(T1) is set to the estimated end date E1, and the estimated end date E1 is set to the estimated end date E0 minus aveET(T0). The aveET(Ti) corresponds to the averageElapsedTime(Td).

The speculative execution controller 250 determines whether the task Ti is included in the list P_task, i.e., whether the target task Ti is speculatively executable. If the target task Ti is included in the list P_task, a remaining period $\alpha$(Ti) is set to the deadline(Ti) minus expectedExecutionDateTime(Ti). The remaining period $\alpha$(Ti) is the remaining period for executing the task Ti. The expectedExecutionDateTime(Ti) is the expected execution date. In other words, the remaining period $\alpha$(Ti) for executing the task Ti is the gap between the final deadline to initiate the execution of the task and the expected execution date. Such gap indicates a length of a period between the expected execution date and the final deadline to initiate the execution.

The variable i is set to i+1, i.e., the variable i of the task Ti is incremented by one. The speculative execution controller 250 then determines whether the variable i is equal to I (i==I?). If the variable i is not equal to I, the speculative execution controller 250 returns to the above process of setting Deadline(Ti) to the estimated end date Ei and the estimated end date Ei+1 to the estimated end date Ei minus aveET(Ti), respectively, and repeats the above calculation until the variable i reaches I, i.e., until finishing the calculation for all task Ti on the route Qr. If the variable i is equal to I, the variable r is set to r+1, i.e., the variable r of the route Qr is incremented by one.

The speculative execution controller 250 determines whether the variable r is equal to R (r==R?). If the variable r is not equal to R, the speculative execution controller 250 returns to the above process of acquiring information on each task Ti($0 \leq i < I$) on the route Qr, and repeats the above calculation until the variable r reaches R, i.e., until finishing the calculation for all task Ti on the route Qr. If the variable r is equal to R, the operation for calculating the remaining period finishes.

At step 208 in FIG. 2, the speculative execution controller 250 calculates the standard cost. In this embodiment, the standard cost is defined as the average cost. A variable cost_max is set to zero. In other words, the maximum cost to be calculated is initially set to zero. The variable j is then set to zero, i.e., the task T0 (j=0) is selected as a processing target among all tasks T0 to TJ−1 in the list p_task. The variable k is set to zero, i.e., the user U0 (k=0) is selected among all users U0 to UK−1 for the task Tj. A variable laborCost, which represents a user's cost, is set to zero.

The speculative execution controller 250 updates the laborCost. More specifically, updated laborCost is calculated by multiplying unitCost and averageElapsedTime(Uk, Tj), and adding that multiplication result to the current laborCost. The unitCost, i.e., the user's cost per unit time, is determined depending on the user's job title. For example, the unitCost may be 20 dollars per hour for a manager, and 40 dollars per hour for a director. The averageElapsedTime (Uk, Tj) is the average processing time for the user Uk to execute the task Tj, as described above. The multiplication result indicates laborCost of the user Uk to execute the task Tj.

By default, the variable j=0, the variable k=0, and the laborCost=0, the equation is thus as follows:

laborCost=0+unitCost($U0$)*averageElapsedTime($U0$, $T0$).

The variable k is set to k+1, i.e., the variable k of the user Uk is incremented by one. The speculative execution controller 250 then determines whether the variable k is equal to K (k==K?). If the variable k is not equal to K, the speculative execution controller 250 returns to the above process of updating the laborCost, and repeats the above calculation until the variable k reaches K, i.e., until finishing the calculation for all users Uk.

If the variable k is equal to K, the speculative execution controller 250 calculates aveLaborCost(Tj) by dividing laborCost by the variable K. In other words, if the calculation for all users finishes, the speculative execution controller 250 calculates the aveLaborCost(Tj) by dividing the obtained laborCost by the variable K, i.e., dividing a total of the laborCost of all users Uk by the variable K, to obtain the average of the laborCost.

The speculative execution controller 250 calculates the cost(Tj) by adding the aveLaborCost(Tj) and getOtherCost (Tj). The getOtherCost(Tj) is the cost except the labor cost, such as a mail service cost and a communication cost. The speculative execution controller 250 determines whether the cost(Tj) is less than the cost_max. If the cost(Tj) is less than the cost_max, the cost_max is set to the cost(Tj). By default, the variable cost_max is zero, and the cost_max is then assigned a value. If the cost(Tj) is not less than the cost_max, the above process of setting the cost_max to the cost(Tj) will be skipped.

The variable j is set to j+1, i.e., the variable j of the task Tj is incremented by one. The speculative execution controller 250 then determines whether the variable j is equal to J (j==J?). If the variable j is not equal to J, the speculative execution controller 250 returns to the above process of setting the variable k to zero, and repeats the above calculation until the variable j reaches J, i.e., until finishing the calculation for all tasks Tj in the list p_task. If the variable j is equal to J, the operation for calculating the average cost finishes.

In this embodiment, the average cost is used as the cost of the task Tj. However, the cost of the task Tj is not limited thereto. For example, the cost of the task may be the maximum cost among all users Uk for the task Tj.

As described in step 209 in FIG. 2, the speculative execution controller 250 decides to speculatively execute a task out of the tasks included in the business process. In particular, the speculative execution controller 250 creates a tasks list by using the objective function f(Tj). The tasks list is a list of tasks to be speculatively executed.

The variable j is set to zero, i.e., the task T0 is selected as the processing target among all tasks T0 to TJ−1 in the list p_task. The speculative execution controller 250 calculates the evaluation variable f(Tj) for the task Tj based on the remaining period α(Tj), the estimated execution ratio P(Tj), and the average cost (Tj). In particular, the speculative execution controller 250 calculates the evaluation variable f(Tj) with the following formula:

$$f(Tj)=s \cdot S(\alpha(Tj))+t \cdot S(1-P(Tj))+u \cdot S(\text{cost}(Tj))$$

The speculative execution controller 250 then determines whether the variable f(Tj) is less than a threshold (f(Tj) <threshold?). If the variable f(Tj) is less than the threshold, the speculative execution controller 250 acquires the userlist, which represents a list of the users assigned the task Tj sorted in order of highest to lowest accuracy (Uk, Tj) and/or in order of shortest to longest processing time. The speculative execution controller 250 adds the userlist for the task Tj to the list of the speculative tasks s_task.

The variable j is set to j+1, i.e., the variable j of the task Tj is incremented by one. The speculative execution controller 250 then determines whether the variable j is equal to J (j==J?). If the variable j is not equal to J, the speculative execution controller 250 returns to the above process of calculating the evaluation variable f(Tj) and repeats the above calculation until the variable j reaches J, i.e., until finishing the calculation for all tasks Tj in the list of the speculative tasks s_task. If the variable j is equal to J, the operation for calculating the speculative tasks list finishes.

As described in step 210 in FIG. 2, the process controller 260 identifies a user to execute the task. In this embodiment, the variable j is set to zero, i.e., the task T0 is selected as the processing target among the tasks T0 to TJ−1 in the list p_task. The process controller 260 then determines whether the task Tj is in a resultSet. The resultSet is a file containing the result of the previous speculative execution. For example, the resultSet may contain values of the variables.

If the task Tj is in the resultSet, i.e., the speculative execution of the task Tj has been performed, the process controller 260 executes the task Tj by using the previous result of the speculative execution. If the task Tj is not in the resultset, i.e., the speculative execution of task Tj has not been performed, the process controller 260 executes the task Tj.

Subsequent operation may include, for example, four decision nodes (first decision node, second decision node, third decision node, fourth decision node), which constitute a loop for event processing. In other words, if a condition in one of the four decision nodes is satisfied, i.e., an event in one of the four decision nodes occurs, a process starts based on the satisfied condition, i.e., the occurred event. Such decisions at the four decision nodes may be executed by an event handler included in the process controller 260. The event handler may detect the occurred event once a condition in the decision nodes is satisfied, or may monitor the status of an execution program periodically.

The process controller 260 then determines whether the task Tj has been delegated (first decision node). A delegated task refers to a task that has been delegated to another user from the user originally assigned the task. Such another user may be any person in this process. If the task Tj has been delegated, the process controller 260 advances to the next item in the list of the speculative tasks s_task. The list of the speculative task s_task may include a set of the task Tj and the user assigned the task Tj.

If the task Tj has not been delegated, the process controller 260 determines whether the task Tj in the execution context has been executed (second decision node). If the task Tj has not been executed, the process controller 260 determines whether any user's schedule has been changed (third decision node). If the user's schedule has been changed, the process controller 260 performs recalculation. In other words, the process controller 260 controls the control blocks, as shown in FIG. 1, to restart the above mentioned operation from step 204 in FIG. 2. The recalculation result of estimating the execution ratio, may be the same as the result of the previous calculation, and thus the recalculation of the operation may be skipped.

If the user's schedule has not been changed, the process controller 260 determines whether the execution result of the task Tj has been returned (fourth decision node). The task Tj may include the task Tj in the execution context and the task Tj in the speculative tasks s_task.

If the execution result of the task Tj has been returned, the process controller 260 stores the task Tj and the variable values in t_resultSet. The t_resultSet is a file containing the result of the speculative execution for each task Tj. For example, the t_resultSet may include values of the variables. If the execution result of the task Tj has not been returned, the above process of storing the task Tj and the variable values in t_resultSet will be skipped.

The process controller 260 then waits until the state of the business process changes. In other words, the process controller 260 waits until at least one of the conditions in the four decision nodes is satisfied. The process controller 260 may detect the occurred event by repeating the above four decisions periodically, instead of merely waiting for the change in the state of the business process.

If the task Tj in the execution context has been executed, the process controller 260 transfers the tasks and the variable values in the t_resultSet to the process run-time. The process run-time may be the process controller 260. The process controller 260 then determines whether an executable task exists. The executable task is the task in the execution context and the subsequent task in the t_resultSet.

If the executable task exists, the process controller 260 executes the task and moves the execution context. The process controller 260 then deletes the executable task and the variable value of the executable task from the t_resultSet. If no executable task exists, the process controller 260 sets the resultSet to the t_resultSet, and clears the t_resultSet. More specifically, the process controller 260 stores information on the unexecutable tasks for use in the above process of determining whether the task Tj is in a resultSet, and then clears the t_resultSet so that the t_resultSet may be used in the subsequent task.

The variable j is set to j+1, i.e., the variable j of the task Tj is incremented by one. The process controller 260 then determines whether the variable j is equal to J (j==J?). If the variable j is not equal to J, the process controller 260 returns to the above process of determining whether the task Tj is in a resultSet, and repeats the above calculations until the variable j reaches J, i.e., until finishing the calculation for all speculative tasks s_task. If the variable j is equal to J, the operation to control the speculative execution finishes.

Hereinafter, an exemplary execution of a business process according to an embodiment will be described in detail.

Figure 4:
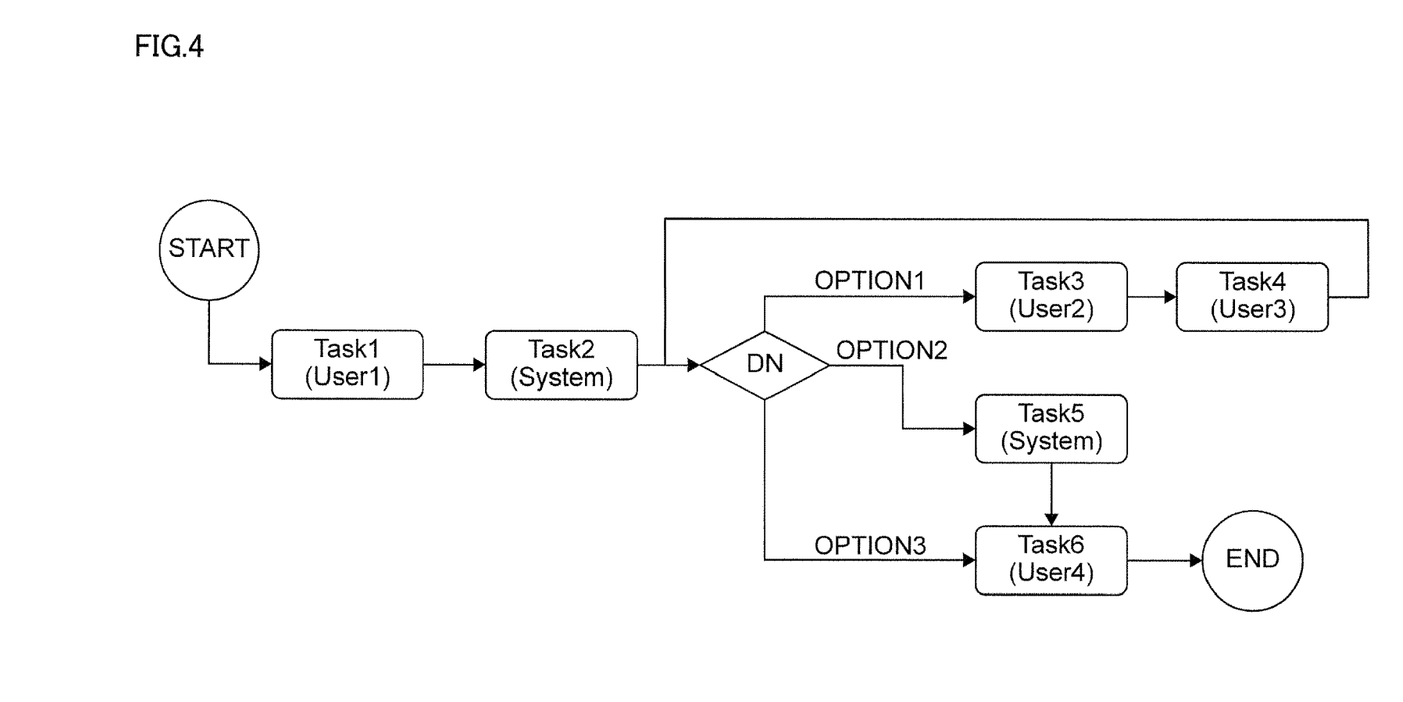
FIG. 4 is a diagram of an exemplary business process.

FIG. 4 is a diagram of an exemplary business process. As shown in the figure, the business process involves multiple tasks and branches. In particular, the business process involves six tasks Task 1 to Task 6, and one decision node DN. In the business process, a User 1 executes the Task 1, a system executes the Task 2, a User 2 executes the Task 3, a User 3 executes the Task 4, the system executes the Task 5, and a User 4 executes the Task 6.

The decision node DN, which is a conditional branch point, is located after the Task T2, and indicates that a decision needs to be made to select a path from three possible paths leading to the Task 3 (Option 1), the Task 5 (Option 2), and the Task 6 (Option 3), respectively. The path from the decision node DN through Task 3 to Task 4 may be taken only one time. Thus, there are four possible paths in the business process: (1) Task 1-Task 2-Task 3-Task 4-Task 5-Task 6, (2) Task 1-Task 2-Task 3-Task 4-Task 6, (3) Task 1-Task 2-Task 5-Task 6, and (4) Task 1-Task 2-Task 6. This business process may be an automobile insurance approval process, for example.

TABLE 1

| Task | User | Cost Per Hour (dollar) | Variables (read) | Variables (write) | Probability (%) | averageElapasedTime (day) |
|---|---|---|---|---|---|---|
| Task1 | User1 | 10 |  | autoQuoteReq | 100 | 1 (day) |
| Task2 | φ |  | autoQuoteReq | eligibleResp | 100 | 30 seconds |
| Task3 | User2 | 20 | autoQuoteReq | eligibleResp | 20 | 1 (day) |
| Task4 | User3 | 100 | autoQuoteReq | eligibleResp | 20 | 1 (day) |
| Task5 | φ |  | autoQuoteReq | autoQuoteResp | 50 | 30 seconds |
| Task6 | User4,5 | 10 | autoQuoteReq eligibleResp autoQuoteResp |  | 100 | 1 (day) |

Table 1 shows exemplary task properties of the tasks involved in the business process shown in FIG. 4. Such task properties are used by the determining unit 240 and the speculative execution controller 250. The table may include data of "User", "CostPerHour (dollar)", "Variables (read)", "Variables (write)", "Probability", and "averageElapsedTime (day)". The data of "User", "CostPerHour (dollar)", "Variables (read)", and "Variables (write)" are obtained from the BPD, while the data of "Probability", and "averageElapsedTime (day)" are calculated based on the process execution history. The "Probability" corresponds to the estimated execution ratio P(Tj).

TABLE 2

| User | Cost Per Hour (dollar) | Day-off |
|---|---|---|
| User1 | 10 | — |
| User2 | 20 | 2013 Jul. 2-2013 Jul. 3 |
| User3 | 100 | — |
| User4 | 10 | — |

Table 2 shows a table showing exemplary user properties of the users involved in the business process shown in FIG. 4. Such user properties are used by the schedule acquiring unit 230 and the speculative execution controller 250. The table may include data of "User", "CostPerHour (dollar)", and "Day-off". The data of "User" and "CostPerHour (dollar)" are obtained from the BPD, while the data of "Day-off" is obtained from the schedule information.

TABLE 3

| Task instanced id | Task name | User | Process instance id | Start time | End time | Status |
|---|---|---|---|---|---|---|
| Ti_0 | T1 | User1 | Pi_0 | Jul 1, 2013 2:02:15 PM | Jul 1, 2013 2:34:25 PM | Completed |
| Ti_1 | T1 | User1 | Pi_1 | Jul 1, 2013 2:09:53 PM | Jul 1, 2013 3:07:36 PM | Completed |
| Ti_2 | T2 | System | Pi_0 | Jul 1, 2013 2:34:15 PM | Jul 1, 2013 2:59:55 PM | Completed |
| Ti_3 | T2 | System | Pi_1 | Jul 1, 2013 3:07:37 PM | Jul 1, 2013 3:34:10 PM | Completed |

TABLE 4

| Process instance id | Start time | End time |
|---|---|---|
| Pi_0 | Jul 1, 2013 2:02:15PM | Jul 1, 2013 6:09:56 PM |
| Pi_1 | Jul 1, 2013 2:09:53PM | Jul 1, 2013 10:26:36 PM |
| Pi_2 | Jul 1, 2013 2:18:01PM | Jul 2, 2013 4:34:18 AM |

Table 3 and Table 4 show an exemplary process execution history. In particular, Table 3 shows the history associated with a task instance id. Table 4 shows the history associated with a process instance id. Such execution history is used by the estimating unit 210 and the accuracy calculating unit 220. Table 3 includes data of "Task instance id", "Task name", "User", "Process instance id", "Start time", "End time", and "Status". Table 4 includes data of "Process instance id", "Start time", and "End time". The data in the tables may be a part of the process execution history.

Table 3 includes multiple process instance ids PI_0 and Pi_1. The table also includes multiple task instance ids Ti_0 to Ti_3. Ti_0 represents the Task 1 involved in the process instance id Pi_0, Ti_1 represents the Task 1 involved in the process instance Pi_1, Ti_2 represents the Task 2 involved in the process instance Pi_0, and Ti_3 represents the Task 2 involved in the process instance Pi_1.

Hereinafter, a first specific example of the business process shown in FIG. 4 will be described in detail. The business process of the first example starts on July 1, and needs to be completed by July 5. The task properties of each task are set as shown in Table 1.

Referring to Table 1, the average processing time, as indicated by averageElapsedTime, for the Tasks 1, 3, and 4 is one day while the average processing time for the Tasks 2 and 5 are 30 seconds. Under such conditions, the estimated date Di_Max is estimated to be July 4, in other words, the business process may be completed before the deadline of July 5. Consequently, the business process requires no speculative execution.

Hereinafter, a second specific example of the business process shown in FIG. 4 will be described in detail. The business process of the second example is under the same conditions as the first example, except that the User 2 takes days-off on July 2 and July 3. Under such schedule, the User 2 executes the Task 3 on July 4. Under such conditions, the estimated date Di_Max is estimated to July 6, in other words, the business process may be completed after the deadline of July 5. Consequently, the business process requires speculative execution.

Hereinafter, an example of the result of the speculative execution performed in a balanced manner will be described in detail. The business process is under the same conditions as the second example, in particular the User 2 takes days-off on July 2 and July 3, and this business process requires the speculative execution to meet the deadline.

As mentioned above, the speculative execution is performed by using the objective function f(Tj):

$$f(Tj) = s \cdot S(\alpha) + t \cdot S(1 - P(Tj)) + u \cdot S(\cos t(Tj))$$

The result of the speculative execution may vary depending the variables s, t, and u. These variables s, t, and u may be set to any values.

In this example, the variables s, t, and u are set in a balanced manner, namely, $s = t = u = 1/3$. In other words, the variables s, t, and u are set evenly. The current point is assumed to be July 1 in this example. The route Qr from the Task 1 to the end of the business process is Task 2-Task 3-Task 4-Task 5-Task T6.

In this example, the speculative execution controller 250 determines to perform the speculative execution of the Tasks 2, 3, 4, and 5. Thus, the Tasks 2 and 5 are speculatively executed on July 1. The Task 3 is speculatively executed on July 4, which is after the days-off of the User 2. The Task 4 is speculatively executed on July 2.

After the User 2 executes the Task 3 on July 4, the User 4 executes the Task 6 on July 5 by using the result of the speculatively executed Tasks 4 and 5. Consequently, the business process may be completed before the deadline by using speculative execution.

Hereinafter, an example of the result of the speculative execution performed with a higher weight on the deadline of the business process will be described in detail. The conditions in this example are the same as those in the above example with the balanced manner, except the variables s, t and u. In this example, the variables s, t, and u are set with a higher weight on the deadline, namely, $s = 1$, and $t = u = 0$.

In this example, the speculative execution controller 250 controls the speculative execution in the same way as the above example with the balanced manner. In particular, the speculative execution controller 250 determines to perform the speculative execution of the Tasks 2, 3, 4, and 5. Thus, the Tasks 2 and 5 are speculatively executed on July 1. The Task 3 is speculatively executed on July 4, which is after the days-off of the User 2. The Task 4 is speculatively executed on July 2. After the User 2 executes the Task 3 on July 4, the User 4 executes the Task 6 on July 5 by using the result of the speculatively executed Tasks 4 and 5. Consequently, the business process is completed before the deadline.

Hereinafter, an example of the result of the speculative execution performed with a higher weight on the execution ratio will be described in detail. The conditions in this example are the same as those in the above example with the balanced manner, except the variables s, t and u.

In this example, the variables s, t, and u are set with a higher weight on the estimated execution ratio, namely, t=1, and s=u=0. In this example, the speculative execution controller 250 determines to perform the speculative execution of the Tasks 2 and 5. The Tasks 2 and 5 are speculatively executed on July 1. After the User 2 executes the Task 3 on July 4, the User 3 executes the Task 4 on July 5, and the User 4 executes the Task 6 on July 6 by using the result of the speculatively executed Task 5. Consequently, the business process may be completed after the deadline.

Hereinafter, an example of the result of the speculative execution performed with a higher weight on the cost will be described in detail. The conditions in this example are the same as those in the above example with the balanced manner, except the variables s, t and u. In this example, the variables s, t, and u are set with a higher weight on the cost, namely, u=1, and s=t=0.

In this example, the speculative execution controller 250 determines to perform the speculative executions the Tasks 2, 3, and 5. In this example, CostPerHour of the User 3 is high (refer to Table 2), and thus the speculative execution of the Task 4 is skipped. The Tasks 2 and 5 are speculatively executed on July 1. After the User 2 executes the Task 3 on July 4, the User 3 executes the Task 4 on July 5, and the User 4 executes the Task 6 by using the result of the speculatively executed Task 5. Consequently, the business process may be completed after the deadline.

The above values of the variables s, t, and u are given as examples and these values may be changed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory (EPROM or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
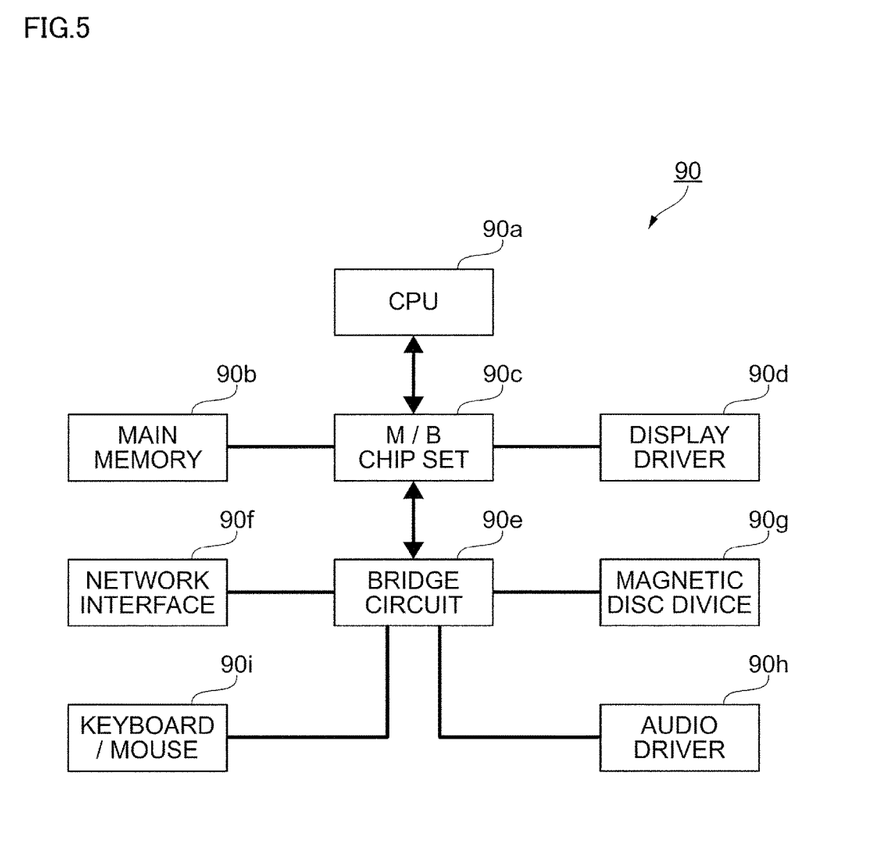
FIG. 5 is a diagram showing an example of the hardware configuration of a computer able to implement an exemplary embodiment.

Finally, the hardware configuration of a computer able to implement this exemplary embodiment will be explained. FIG. 5 is a diagram showing an example of the hardware configuration of a computer 90 able to implement an exemplary embodiment. As shown in the figure, the computer 90 includes a central processing unit ("CPU") 90a serving as a computing unit, a main memory 90b connected to the CPU 90a via a motherboard ("M/B") chip set 90c, and a display driver 90d connected to the CPU 90a via the same M/B chip set 90c. A network interface 90f, magnetic disk device ("HDD") 90g, audio driver 90h, and keyboard/mouse 90i are also connected to the M/B chip set 90c via a bridge circuit 90e.

In FIG. 5, the various configurational elements are connected via buses. For example, the CPU 90a and the M/B chip set 90c, and the M/B chip set 90c and the main memory 90b are connected via CPU buses, respectively. Also, the M/B chip set 90c and the display driver 90d may be connected via an accelerated graphics port ("AGP"). However, when the display driver 90d includes a PCI express-compatible video card, the M/B chip set 90c and the video card are connected via a PCI express ("PCIe") bus. Also, when the network interface 90f is connected to the bridge circuit 90e, a PCI Express bus may be used for the connection, for example. For connecting the magnetic disk drive 90g to the bridge circuit 90e, a serial AT attachment ("ATA"), a parallel-transmission ATA, or peripheral components interconnect ("PCI") may be used. For connecting the keyboard/mouse 90i to the bridge circuit 90e, a universal serial bus ("USB") may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system configured to schedule a business process including tasks, comprises:
   a calculation unit configured to calculate, for each task, an estimated processing time required to execute at least one task using an average time to execute tasks according a process execution history;
   a determination unit configured to generate a speculative execution determination according to an estimated end time of a route including the tasks relative to a deadline of the business process determined by comparing the estimated processing time of the tasks with a schedule of each one of users to execute the tasks, the route running from an execution context to an end of the business process;
   a decision unit configured to schedule speculative execution of a task out of the tasks included in the business process in response to the speculative execution determination according to a remaining period to execute the task calculated according to a difference between a predicted execution timing of the task and the deadline of the business process, and to identify a user to speculatively execute the task;
   a process controller configured to update the identified user's schedule including the scheduled speculative execution of task; and
   a display configured to notify the identified user about the task to be speculatively executed.

2. The system of claim 1, wherein:
   the decision unit is further configured to decide to speculatively execute the task on the basis of the remaining period, an estimated execution probability of executing the task, and a standard cost required to execute the task, the standard cost being calculated on the basis of a unit cost of each one of the users to execute the task and a time required for each one of the users to execute the task.

3. The system of claim 2, wherein:
   the decision unit is further configured to decide to speculatively execute the task when a value exceeds a predetermined threshold value, the value being obtained by adding weighted values of the estimated execution probability, the remaining period and the standard cost.

4. The system of claim 1, further comprising a processing accuracy calculation unit configured to calculate, for each task, processing accuracy that indicates whether the business process including the at least one task executed by one of the users is completed normally, wherein:
   the decision unit is further configured to identify a user to speculatively execute the task on the basis of the processing accuracy.

5. The system of claim 1, further comprising a processing accuracy calculation unit configured to calculate, for each task, processing accuracy that indicates whether the business process including the at least one task executed by one of the users is completed normally, wherein:

the calculation unit is further configured to estimate a user's processing time for each task, the user's processing time indicating a time required for each one of the users to execute the at least one task; and the decision unit is further configured to identify a user to speculatively execute the task on the basis of the processing accuracy and the user's processing time.

6. A method for scheduling a business process including tasks, comprising:

estimating a user's processing time for each task, the user's processing time indicating a time required for each one of users to execute at least one task;

calculating an estimated processing time required to execute the at least one task on the basis of the estimated user's processing time;

calculating processing accuracy for each task, the processing accuracy indicating whether the business process including the at least one task executed by one of the users is completed normally;

calculating an estimated end time of a route including the at least one task, the route running from an execution context to an end of the business process, the estimated end time being calculated on the basis of the estimated processing time of the at least one task and a schedule of each one of the users;

determining to apply speculative execution to the business process on the basis of the estimated end time of the route;

calculating, for each task, an estimated execution probability of executing east one task;

calculating a remaining period for executing each task that is speculatively executable, out of the tasks included in the business process, the remaining period being calculated on the basis of a predicted execution timing of each task and a deadline of the business process;

calculating a standard cost required to execute each task that is speculatively executable;

deciding to speculatively execute a task out of the tasks included in the business process when a value exceeds a threshold value, the value being obtained by adding weighted values of the estimated execution probability, the remaining period and the standard cost;

identifying a user to speculatively execute the task on the basis of the processing accuracy and the user's processing time; and notifying the identified user about the task to be speculatively executed.

7. A computer program product for scheduling a business process including tasks, the computer program product comprising a computer readable storage medium having program instructions embodied therewith, the program instructions executable by a computer processor configured to:

estimate a user's processing time for each task, the user's processing time indicating a time required for each one of users to execute at least one task;

calculate an estimated processing time required to execute the at least one task on the basis of the estimated user's processing time;

calculate an estimated end time of a route including the at least one task, the route running from an execution context to an end of the business process, the estimated end time being calculated on the basis of the estimated processing time of the at least one task and a schedule of each one of the users;

determine to apply speculative execution to the business process on the basis of the estimated end time of the route;

decide to speculatively execute a task out of the tasks included in the business process upon the determination to apply the speculative execution, the decision being made on the basis of at least one of an estimated execution probability of executing the task, a remaining period for executing the task, and a standard cost required to execute the task, the remaining period being calculated on the basis of a predicted execution timing of the task and a deadline of the business process, the standard cost being calculated on the basis of a unit cost of each one of the users and a time required for each one of the users to execute each task;

identifying a user to speculatively execute the task on the basis of the processing accuracy and the user's processing time;

identified user's schedule including the scheduled speculative execution of task; and notifying the identified user about the task to be speculatively executed.

8. The computer program product of claim 7, Wherein:

the decision to speculatively execute the task is made when a value exceeds a threshold value, the value being obtained by adding weighted values of the estimated execution probability, the remaining period and the standard cost.

9. The computer program product of claim 7, wherein the computer program product further causes the computer to:

calculate, for each task, processing accuracy that indicates whether the business process including the at least one task executed by one of the users is completed normally.

* * * * *